May 13, 1958     S. JONES     2,834,144
FISHING LEADER HOLDER
Filed Feb. 17, 1955
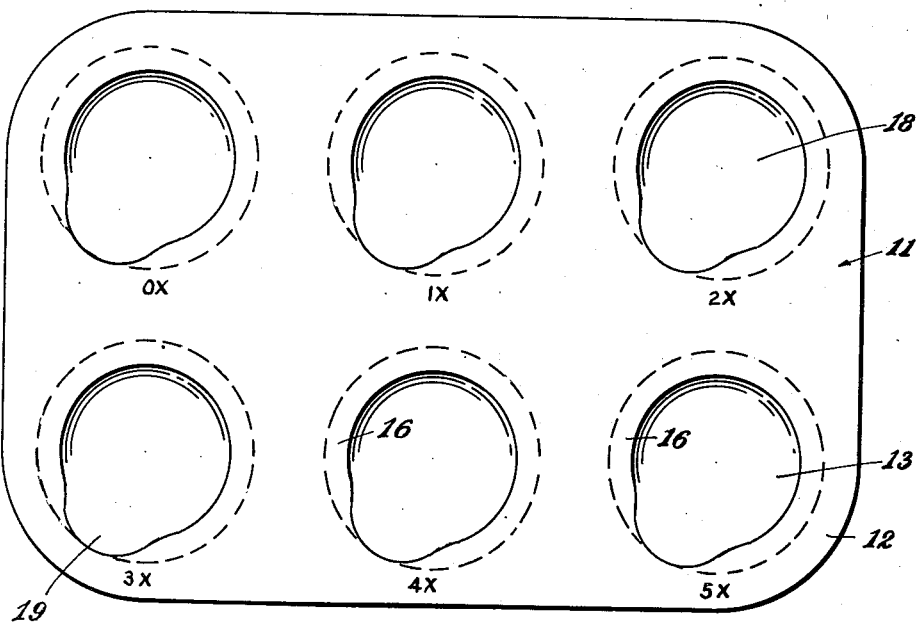
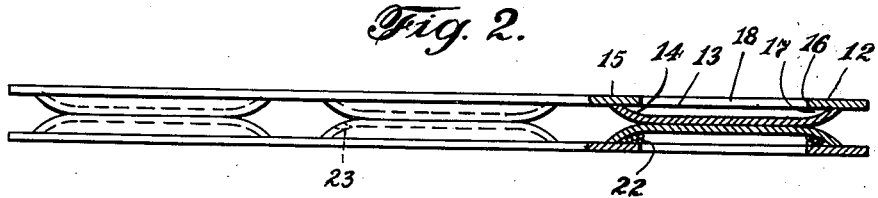
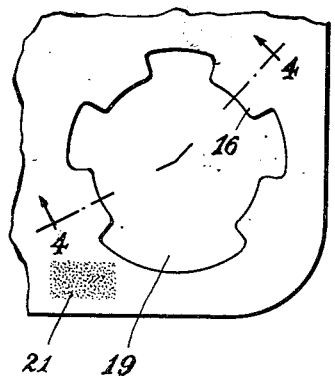
INVENTOR.
STEPHEN JONES
BY
ATT'Y.

United States Patent Office 2,834,144
Patented May 13, 1958

2,834,144

FISHING LEADER HOLDER

Stephen Jones, Binghamton, N. Y.

Application February 17, 1955, Serial No. 488,781

5 Claims. (Cl. 43—54.5)

This invention relates to fishing tackle, and more particularly to a new and useful device for holding coiled fishing leaders and tippets. Experienced anglers classify their fishing leaders of nylon or gut according to thickness, length, and sometimes according to taper. It is difficult for an angler to select desired leaders unless they are in some manner neatly filed, so that any particular one might be chosen at random. Many leader holders in common use consist of a device about which leaders might be wrapped separate from one another. Holders of this type tend to be bulky, and the leaders being of a generally springy nature, tend to become loose on the mounting, and consequently difficult to handle.

The principal object of the present invention is to provide a holder for fishing line leaders or other filamentary items that readily allows such items to be inserted or withdrawn in the coiled condition.

A second object is to provide a holder wherein the natural resiliency of the leader, and the tendency of the coiled leader to increase in diameter, hold the leader more firmly in position.

A further object is to provide a compact holder that will fit in the pocket of a wearer, that is capable of holding a substantial number of different leaders, each being supported independently of the other.

A still further object is to provide a leader holder allowing the various types of leaders to be filed separately therein with identifying indicia by which a desired leader may be selected readily by reference to the indicia.

A final object of the invention is to provide duplex flat plate-like holders for a group of leaders mounted in back to back relation to provide a rigid construction that will withstand rough handling.

Various other objects and advantages of the invention will become more fully apparent from the following description and from the appended drawing illustrating preferred embodiments of the invention.

In the drawing,

Fig. 1 is a plan view of a multiple unit holder having provision for the filing of six separate leaders on each of two opposite faces of the structure.

Fig. 2 is a front elevational view of the construction shown in Fig. 1, with certain parts broken away, and illustrated in section;

Fig. 3 is a fragmentary view of a single filing unit showing a modified means for holding the coiled leaders in place; and Fig. 4 is a sectional view taken on the line 4—4 of Fig. 3.

Generally speaking the present invention consists of a generally flat plate having one or more concave recesses formed therein, preferably of generally circular shape, and having an overhanging rim extending about the major portion of the periphery. The rim is relieved in at least one place to allow the insertion of a finger for inserting and withdrawing coiled filaments beneath the projections and within the cavity.

Referring again to the drawing and more particularly to Figs. 1 and 2, one form of the invention comprises a holder 11 consisting of a generally flat plate or base 12 into the surface of which are formed one or more recesses 13. The plate 12 may comprise light sheet metal such as aluminum or possibly steel. As an alternative, the plate may comprise a plastic, molded in one piece, or the assembly may be built up from separate components. Of the plastics, cellulose acetate, a polyvinyl resin, or methylmethacrylate, are suitable, and being transparent offer the advantage of allowing the coiled leaders to be seen through the walls, helping to identify them.

The recesses or receptacles 13 are formed by the gently sloping concave side and bottom walls 14 that merge gradually in at least one portion with the face 15 of the plate 12. The diameter of the recesses is not critical, but a dimension of the order of 2" has proved satisfactory.

A rim or projection 16 extends about the periphery of the cavity substantially in the plane of the face 15 and extends inwardly a slight distance toward the center of the mouth, or opening of the cavity, to define an inner annular groove or chamber 17 in cooperation with the adjoining portion of the wall 14. In Figs. 1 and 2, the groove 17 is illustrated as a flange projecting partially across the crater 18 formed by the recess 13. The rim 16 preferably is relieved to the maximum diameter about a minor portion of the periphery to form a natural opening 19 large enough to receive the finger of the user for the insertion and removal of coiled leaders.

If desired the plate 12 and the rim 16 may be formed from a single sheet of material, as illustrated in Figs. 3 and 4. In this case use is made of separate flanges or projections located fairly close together, except for the opening 19, through which the coiled leaders are passed during use. In either case, an inner annular groove or guideway is formed adjacent to the major diameter of the recess, and beneath the flange or rim 16, being defined by the rim and the adjoining sloping walls of the cavity.

A considerably stronger unit, having the reinforced properties of a built-up beam construction results if the plates 12 are assembled in tandem, back to back, as shown in Fig. 2, so that the bottoms of the cavities engage each other. The mating walls of the respective recesses may be secured together as by fusion, spot-welding, or cement, according to the material used in the plates 12. While I do not choose to limit the dimensions of the device, a 12 element holder made according to the duplex construction of Fig. 2, and having six recesses on each face, may have a width of approximately 4½", a length of approximately 6¾", and a thickness of between ⅜" and ½", depending on whether sheet metal or plastic is used in the construction.

Permanent identifying indicia may be inscribed in the face of the plate 12, as shown in Fig. 1, or a roughened surface portion 21 may be furnished adjacent to each of the recesses to receive pencil or similar inscriptions.

In operation, a leader to be filed in the holder is coiled about the user's index finger and middle finger forming a coil 22 roughly 1½" in diameter. The coil is slid through the opening 19 and under the rim 16. When the finger is removed, the coil follows a natural tendency to expand and fits snugly within the annular guide or groove formed by the rim 16 and the adjoining concave walls 14. To remove a coil, the finger is placed in the opening 19, pressed against the turns and the coil withdrawn, during which operation the coil constricts, as it passes through the opening 19, as indicated in Fig. 1. In some instances, where it is desired to leave a fish hook attached to the leader, a small opening 23 may be formed in the cavity through which the hook may be passed for engagement with the opposite wall of the cavity to hold the hook in place while being protected by the opposing plates 12.

Various modifications and changes are contemplated and may obviously be made without departing from the spirit of the invention as defined in the appended claims.

I claim:

1. A fishing leader holder comprising a plate, a plurality of receptacles formed in said plate, each of said receptacles having sides that slope at an angle of less than 90° with said plate and merge with said plate, and a generally annular rim projecting inwardly partially across each of the cavities formed by said sloping sides to form a central opening and annular guides for receiving coiled fishing leaders through said opening, each of said rims being relieved to the full diameter of said cavity about a portion of the periphery to form a natural opening for the insertion and withdrawal of said coiled leaders.

2. A fishing leader holder comprising a generally flat plate having a concave receptacle with side walls sloping at an angle of less than 90° with said plate formed therein, and projecting portions extending inwardly from the rim of said receptacle to form with side walls an inner annular chamber around the major portion of the periphery of said receptacle, and being relieved about the remaining portion to form an opening that extends to and includes part of said sloping side wall, through which a coiled leader may be withdrawn from said chamber.

3. A fishing leader holder comprising a pair of plates in spaced parallel relation, there being a plurality of recesses formed by recesses in each of said plates, the walls of said recesses in one of said plates engaging and being secured to the corresponding walls of the respective recesses in the other of said plates to thereby hold said plates in fixed spaced relation, and projections extending inwardly from the periphery of said recesses, to form in each an annular region for holding coiled fishing leaders, said projections extending substantially completely about the periphery of said recesses, but being relieved back to said periphery about a region large enough to receive an operator's finger during the insertion and removal of said leaders.

4. A holder for leader-like material comprising a generally flat plate having a compartment with sloping side walls formed therein, and projecting portions generally in the plane of said plate extending inwardly from the rim of said compartment to form with side walls an inner annular groove around the major portion of the periphery of said compartment for receiving therein a constricted coil of filamentary material such as a fishing leader, said projecting portions being a plurality of flanges formed from said sloping side walls.

5. A holder for a coiled length of filamentary material, comprising a receptacle defined by a bottom wall and annular side walls sloping at an angle of more than 90° with said bottom wall, and projections extending radially inward from a part only of the periphery of said side walls, and forming with said side walls portions of a generally annular chamber for receiving said material.

References Cited in the file of this patent

UNITED STATES PATENTS

| | | |
|---|---|---|
| 238,505 | Hore | Mar. 8, 1881 |
| 252,428 | Cashen | Jan. 17, 1882 |
| 255,045 | Smith | Mar. 14, 1882 |
| 275,703 | Price | Apr. 10, 1883 |
| 682,852 | Kidder | Sept. 17, 1901 |
| 915,557 | Cooper | Mar. 16, 1909 |
| 1,827,888 | Greer | Oct. 20, 1931 |
| 2,029,975 | Winchester | Feb. 4, 1936 |
| 2,302,045 | Neumann et al. | Nov. 17, 1942 |
| 2,370,013 | Crowell | Feb. 20, 1945 |
| 2,579,131 | Tinsley | Dec. 18, 1951 |

FOREIGN PATENTS

| | | |
|---|---|---|
| 199,961 | Great Britain | July 5, 1923 |
| 770,087 | France | June 18, 1934 |

OTHER REFERENCES

"Bill Dewitt" publication, "Pyra-Shell Baits and Boxes," pp. 7 and 8.